[11] 3,558,817

[72] Inventors Pieter Marinus Van den Avoort;
Peter Johannes Hubertus Janssen,
Emmasingel, Eindhoven, Netherlands

[21] Appl. No. 737,081
[22] Filed June 14, 1968
[45] Patented Jan. 26, 1971
[73] Assignee U. S. Philips Corporation
New York, N.Y.
a corporation of Delaware by mesne assignments
[32] Priority June 16, 1967
[33] Netherlands
[31] 6708375

[54] TELEVISION RECEIVER HAVING AUTOMATIC MINIMUM BEAM CURRENT CONTROL

8 Claims, 2 Drawing Figs.

[52] U.S. Cl. 178/7.5, 178/54
[51] Int. Cl. H04n 5/18
[50] Field of Search 178/S—4F, 54H, 7.3, 7.5,

[56] References Cited

UNITED STATES PATENTS 2,259,538 12/1969 Wheeler 178/7.5D.C.
2,773,117 12/1956 Clapp et al 178/5.4F

*Primary Examiner*—Robert L. Griffin
*Assistant Examiner*—Donald E. Stout
*Attorney*—Frank R. Trifari ABSTRACT: A television receiver circuit includes a beam current measuring circuit in the cathode circuit of the display tube for producing a control signal for stabilizing the beam current. An electronic switch is also connected in the cathode circuit to bypass the measuring circuit. The switch is bilaterally conductive.

INVENTORS
PIETER M. VAN DEN AVOORT
PETER J. H. JANSSEN
BY
Frank R. Trifari
AGENT INVENTORS
PIETER M.VAN DEN AVOORT
PETER J.H.JANSSEN
BY
[signature]
AGENT

TELEVISION RECEIVER HAVING AUTOMATIC MINIMUM BEAM CURRENT CONTROL

The invention relates to a television receiver having a display tube which includes at least one electron beam-producing device having a cathode to which a beam current-measuring device and an electronic switch are connected and a control electrode to which a control signal containing a reference level is applied, the electronic switch having applied to it a switch-on signal and a switch-off signal, the switch-off signal serving to bring the electronic switch in the nonconductive condition during at least a part of the occurrence of the reference level and the switch-on signal serving to bring the electronic switch in the conductive condition during the rest of the time, so that during the time in which the electronic switch receives the switch-off signal the beam current may be measured by the beam current-measuring device, the beam current being arranged to be stabilized with the aid of a control quantity derived from the beam current measured and applied to a stabilizing device.

From the U.S. Pat. 2,259,538 a television receiver of the kind described is known in which the electronic switch is a tube. Stabilization of a reference level in the beam current caused by the control signal is a very useful manner of coupling the degree of driving or a beam-producing device with the reference level in the control signal, for the beam current is a direct measure of the intensity of the picture displayed. In another frequently used manner of coupling the reference level in the control signal to a given value of the voltage between the cathode and the control electrode, this voltage results in a luminance in the picture which may be dependent upon the values of the supply voltages for the display tube and upon other factors which may be variable. Although in theory in a television receiver of the kind described the beam current stabilization on a reference level in the control signal is preferable to the voltage stabilization frequently used in other types of television receivers, in practice this beam current stabilization method has the following disadvantage. It has been found that the known current stabilization with the use of a tube as the electronic switch gives rise to poor contrast in the picture, especially in the case of abrupt transitions of high luminance to low luminance in picture portions having large contrasts.

It is an object of the present invention to avoid this disadvantage. For this purpose, a television receiver of the kind described in the opening part is characterized in that the said electronic switch is a switch which is bilaterally conductive during the occurrence of the switch-on signal irrespective of the nature of the control signal.

It has been found that the use of such a bilaterally conductive switch eliminates the loss of contrast in the picture. The explanation of this fact is that the capacitance between the control electrode and the cathode of the display tube gives rise to crosstalk of control voltages from the control electrode to the cathode. Negative-going sudden voltage variations, which may occur in the picture in the case of sharp contours and consequent abrupt luminance variations, reach the cathode and hence the switch by way of the said capacitance. When, as has been common practice hitherto, the switch takes the form of a tube the anode of which is connected to the cathode of the display tube, this tube may be cut off by the sudden crosstalk negative-going voltage variations. The tube then offers a high resistance and at the cathode of the display tube a strong negative feedback effect will be produced. As a result there will be a loss of definition and smears will occur in the picture. If, however, in accordance with the invention a bilaterally conductive switch is used, the direction of current flow in the switch can be reversed on the occurrence of negative-going sudden variations of the voltage at the control electrode, so that the switch cannot be blocked. The picture continues to have a high definition and to be rich in contrast, and no smears occur because there is no longer any undesirable negative feedback in the cathode circuit of the display tube.

Embodiments of the invention will now be described, by way of example, with reference to the accompanying diagrammatic drawings, in which:

FIG. 3 is a simplified circuit diagram of a colour television receiver in accordance with the invention having a three-gun-type display tube and transistor-type electronic switches, one in the cathode circuit of each electron gun.

Figure 1:
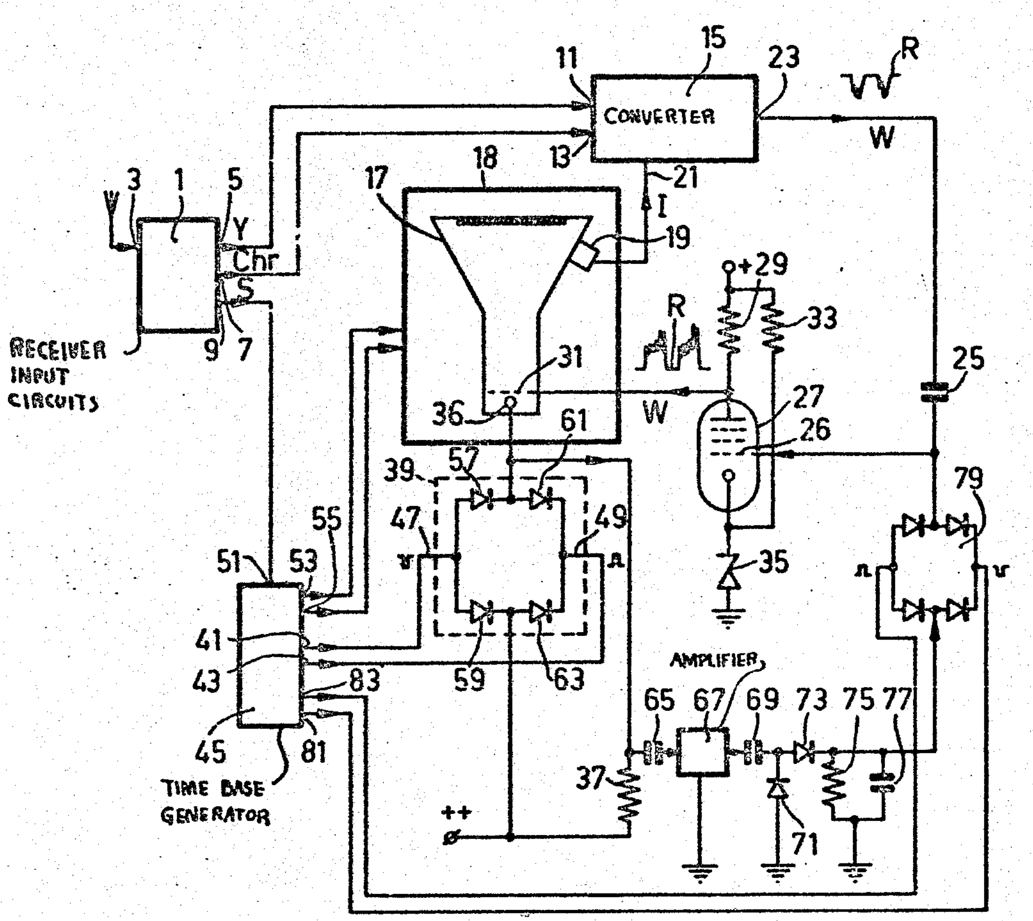
FIG. 1 is a simplified circuit diagram of a colour television receiver in accordance with the invention, having an index-type display tube and a four-diode-type electronic switch in the cathode circuit of the display tube.

For the sake of clarity a number of details not of importance for the understanding of the invention have been ommitted. In FIG. 1, a part 1 has an input 3 and three outputs 5, 7 and 9. In the part 1, a colour television signal received through the input 3 is subjected to high-frequency and intermediate-frequency amplification, is detected once and divided into a luminance signal Y appearing at the output 5, a chrominance signal *Chr* appearing at the output 7 and a synchronizing signal S appearing at the output 9 of the part 1. The outputs 5 and 7 are connected to inputs 11 and 13 of a conversion device 15. In the conversion device 15 the signals Y and *Chr* are rendered suitable for display by an index-type display tube 17 in the display part 18.

For this purpose, an index signal I is derived from the index tube 17 with the aid of a photomultiplier 19 and is also applied to the conversion device 15 through an input 21. The conversion device 15 has an output 23 at which a writing signal W of the type suitable for display by the index tube 17 appears. The writing signal W contains a carrier modulated by the chrominance signal in known manner. This carrier is coupled in frequency to the writing rate of the electron beam in the display tube 17. This coupling is effected with the aid of the index signal I. The writing signal W further includes an adapted luminance signal which is superimposed on the carrier, is derived from the luminance signal Y and the chrominance signal *Chr* and is usually referred to as the monochrome luminance signal. The writing signal W is applied to the control grid 26 of an amplifier tube 27 through a capacitor 25. From the anode of the tube 27, at which a positive supply voltage is set up through a resistor 29, the signal W amplified in the tube 27 is derived and applied to a control electrode 31 of the display tube 17. To the cathode of the tube 27 a very constant voltage is applied through a voltage divider comprising a resistor 33 and a Zener diode 35. The index tube 17 further contains a cathode 36 which together with the control electrode 31 forms part of a beam-generating device, hereinafter referred to as the electron gun. By this electron gun the beam current in the display tube is controlled in intensity in accordance with the voltage difference between the cathode 36 and the control electrode 31. During the time in which a line is written on the display screen of the display tube 17, the mean value of the beam current during several successive periods of the carrier in the writing signal W must never become zero. Otherwise the index signal I would collapse, and because of the nature of the conversion device 15 this would result in substantially preventing a satisfactory colour display during the remainder of this picture line. To prevent the beam current from falling below a given minimum value it is measured and stabilized. The measuring of the beam current is effected during the occurrence of a periodically recurring reference level R in the adapted luminance signal contained in the writing signal W. For this purpose the cathode circuit of the display tube 17 includes a resistor 37 and a switch 39 which according to the invention is of a bilaterally conductive type. The other end of the resistor 37 is connected to a positive supply voltage, which is slightly higher than the positive supply voltage for the tube 27. The switch 39 is controlled by switching signal taken from outputs 41 and 43 of a time base generator 45 and applied to inputs 47 and 49 of the switch 39. The time base generator 45 through an input 51 connected to the output 9 of the part 1 receives the synchronizing signals S, and through outputs 53 and 55 supplies deflection currents to the display part 18. The switch 39 comprises four diodes 57, 59, 61 and 63. By a switch-on, i.e. inhibit, signal, which is shown in FIG. 1, and is applied through inputs 47 and 49, the diodes 57, 59, 61 and 63 are rendered conductive, so that they pass the beam current of the display tube. This is effected during the occurrence of the portion of the writing signal W to be displayed. As mentioned hereinbefore, the writing signal W also contains a reference signal R which is at a constant level in the writing signal W. During the occurrence of this reference signal R, the switch-off signal is applied to the inputs 47 and 49 of the switch 39. As a result, the diodes 57, 59, 61 and 63 are cut off and the beam current from the cathode 36 of the display tube 17 is caused to flow through the resistor 37 so as to produce a voltage across it. During the occurrence of the switch-on signal no voltage is produced across the resistor 37. In accordance with the invention, for this purpose the switch 39 is of a bilaterally conductive type. This means that the switch 39 remains conductive for any absolute direction of the cathode current of the display tube 17. Although the cathode current due to the beam current can always have only one direction because the beam current cannot become negative, it has been found that the cathode current has a component which may have a difficult direction. It has been found that this component is due to charging currents of the capacitance between the control grid 31 and the cathode 36. Hence, during the occurrence of said negative voltage variations at the control electrode 31, the cathode current may reverse its direction. The switch 39 is of the bilaterally conductive type and remains conductive on reversal of the direction of flow of the cathode current. Consequently, the reversed cathode current cannot produce a negative feedback voltage across the resistor 37 and the picture displayed by the display tube 17 remains rich in contrast and shows no smears. Across the resistor 37 a voltage is produced only during the occurrence of the switch-off signal. With a proper choice of the instant of the occurrence of the switch-off signal the voltage across the resistor 37 is a measure of the beam current due to the reference signal R. The voltage across the resistor 37 is applied through a capacitor 65 to an amplifier 67 and after amplification appears at a capacitor 69. The capacitor 69 together with a diode 71 forms a circuit which restores the direct current component (DC restorer). The signal containing the restored direct current component is rectified by a rectifier circuit comprising a diode 73, a resistor 75 and a capacitor 77 and is applied through a clamping switch 79 to the control grid 26 of the tube 27. The tube 27 operates as a differential amplifier for the direct voltage which is applied through the clamping switch 79 and is compared with the constant cathode voltage of the tube 27. THe clamping switch 79 is operated by enabling signals taken from outputs 81 and 83 of the time-base generator 45. This counteracts any variation in the mean beam current of the tube 17 measured during the occurrence of the reference level. Thus, the reference level is accurately coupled to a given stabilized value of the beam current. A proper choice of the value of the beam current which corresponds to the reference level prevents the beam current of the index tube 17 from being suppressed and, as has been mentioned hereinbefore, this is essential to satisfactory operation of this tube. This reference level R in the writing signal W may be the minimum level in this signal or another level which may be artificially introduced in the signal.

Although in the above example a colour television receiver having a single-gun tube as has been described, it will be appreciated that the circuit arrangement in accordance with the invention can readily be used in a black-and-white television receiver having a single-gun display tube.

Furthermore, the voltage amplification by means of the amplifier 67 described in the example, may be replaced by current amplification.

Figure 2:
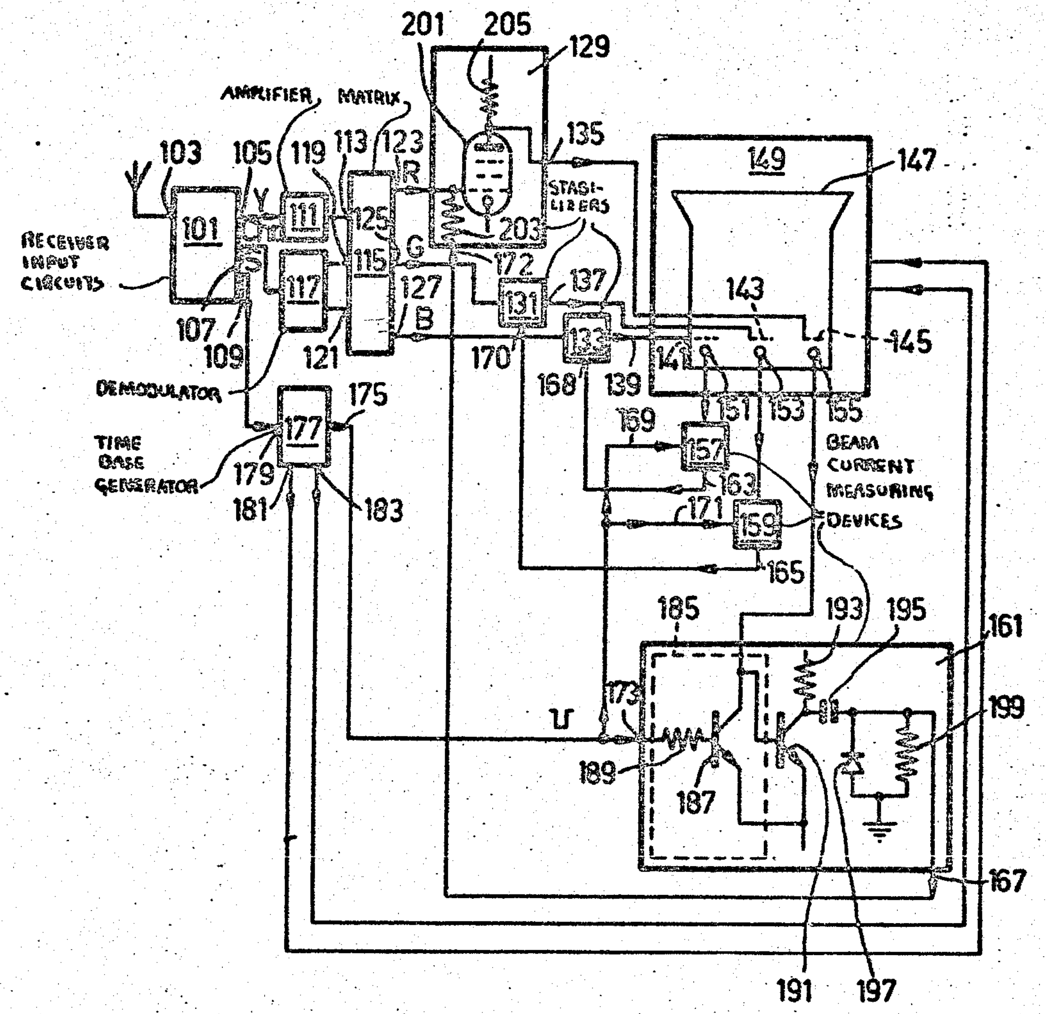

In FIG. 2, a part 100 receives a colour television signal through an input 103. In the part 101 the received signal is subjected to high frequency amplification and intermediate frequency amplification, detected once and separated into a luminance signal Y, a chrominance signal *Chr* and a synchronizing signal S. These signals Y, *Chr* and S appear at output 105, 107 and 109 respectively of the part 101. The luminance signal Y which appears at the output 105 is applied, through an amplifier 111, to an input 113 of a matrix circuit 115. The chrominance signal *Chr* which appears at the output 107 is converted by an amplifier and detector circuit 117 to colour difference signals which are applied to inputs 119 and 121 of the matrix circuit 115. The matrix circuit 115 has three outputs 123, 125 and 127 at which the colour signals R, G and B appear which are composed from the luminance signal and the colour difference signals. These colour signals are each applied to an amplifying and stabilizing circuit 129, 131 and 133, respectively. These circuits have outputs 135, 137 and 139 which are connected to control electrodes 145, 143 and 141 respectively, of a three-gun display tube 147 included in a display part 149. The display tube 147 has three cathodes 151, 153 and 155 connected to beam current-measuring devices 157, 159 and 161, respectively. Outputs 163, 165 and 167 of these beam current-measuring devices 157, 159 and 161 are connected to inputs 168, 170 and 172 of the amplifying and stabilizing circuits 133, 131 and 129 respectively. At each of the outputs 163, 165 and 167 a control voltage appears which is a measure of the beam current of the respective cathode of the display tube during the occurrence of a reference level in the signals R, G and B respectively. The beam current-measuring devices 157, 159 and 161 have inputs 169, 171 and 173 respectively to which a switching signal is applied. This switching signal is taken from an output 175 of a time-base generator 177. Through an input 179, synchronizing signals S from the output 109 of the part 101 are applied to the time-base generator 177. The time-base generator 177 through its outputs 181 and 183 supplies time-base currents to the display part 149 for the deflection of the electron beams of the display tube 147.

The operation of a beam current-measuring device 161 and a cooperating stabilizing device 129 will now be described more fully.

The cathode circuit of the cathode 155 of the display tube 147 includes a switch 185. This switch is in the form of a transistor 187 to the base of which a switching signal is applied through a resistor 189. During the occurrence of a reference level in the colour signal applied to the control electrode 145 of the display tube 147, the transistor 187 is cutoff by the switching signal applied to its base and the beam current is supplied to the base of a second transistor 191. As a result, a voltage which is a measure of the beam current is produced across a resistor 193 in the collector circuit of this transistor 191. During the writing time, transistor 187 receives at its base a voltage, referred to as the switch-on signal, such that this transistor remains conductive irrespective of the nature of the control signal at the control electrode 145, in accordance with the invention. The voltage of the collector of this transistor then is substantially equal to the voltage of the emitter so that substantially no current is supplied to the base of the second transistor 191. Thus, there is produced across the collector resistor 193 of this second transistor 191 an alternating voltage which with the aid of a rectifier circuit comprising a capacitor 195, a diode 197 and a resistor 199 is converted into a direct voltage which appears at the output 167. The switching transistor 187 when conductive is a bilaterally conductive switch. For this purpose its base current is maintained at a sufficient value by the switch-on signal. The transistor remains conductive irrespective of the polarity of the voltage between the collector and the emitter, In accordance with the said polarity the current can flow through the transistor in the corresponding direction. This is necessary because, as has been described with reference to the preceeding example, sudden negative voltage variations may appear at this cathode, which must not be allowed to cutoff the switch 185. The direct voltage taken from the output 167 is applied to the input 172 of the amplifying and stabilizing state 129. This stage includes an amplifier tube to the control grid of which the red colour signal is applied for amplification. To this control grid is also applied, through a resistor 203, the direct voltage applied to the input 172. The anode circuit of the tube 201 includes a resistor 205 across which the voltage variations applied to the control grid are produced in amplified state. Since the anode of the tube 201 is directly connected to the control electrode 145 of the display tube 147, the direct voltage derived from the current-measuring device 161 and applied to the control grid of the tube 201 so influences the beam current that any deviation in the beam current from a desired set value which occurs during the reference level in the control signal at the anode of the tube 201 will be counteracted, for an increase in the beam current results in an increase in the direct voltage at the control grid of the tube 201 so that the anode current increases and the anode voltage decreases. The voltage at the control electrode then will also decrease and consequently the increase in the beam current is counteracted. To each electron gun of the display tube 147 of the colour television receiver is connected a measuring stabilizing device. Consequently a very good colour balance can be maintained in the picture displayed by the display tube 147 under any conditions, even with a very low luminance. This would not be possible with the aid of the usual colour circuits in which the reference level is coupled to a given voltage at the control electrode of the display tube, for such a predetermined voltage, which is produced between a control electrode and the associated cathode of the display tube and is coupled to the reference level, does not always give the same beam current. By means of the above-described circuit arrangement, the same beam current is always obtained at a reference level in the control signal. Large variations in the supply voltages for the display tube 147 may then even be permitted without the colour balance being affected.

Although in the embodiments described the control voltage derived from the measured beam current is applied to the control grid of the display tube, as an alternative the supply voltage of another electrode of the display tube, for example the cathode or the screen grid, may be influenced in order to stabilize the beam current.

We claim:

1. A television receiver comprising a display tube having an electron gun which includes a cathode and a control electrode, a source of video signals which have a reference level occurring at least at predetermined time intervals, stabilizing means connected to apply said video signals to said electron gun, beam current-measuring means, means connecting said beam current-measuring means to said cathode for producing a control signal that is a function of the beam current in said display tube, switch means, means connecting said switch means to said cathode whereby cathode current of said tube bypasses said measuring means when said switch means is closed, a source of a switching signal connected to said switch means for opening said switch means at said predetermined intervals and for closing said switch means at other intervals, and means applying said control signal to said stabilizing means for stabilizing the beam current in said tube, said switch means comprising electronic switch means that is bilaterally conductive during said other intervals irrespective of the absolute direction of the cathode current.

2. A television receiver as claimed in claim 1 wherein said switch means comprises first and second parallel coupled branches, each of said branches comprising two diodes with like electrodes coupled serially together and to said switching signal source, one of the junctions of the unlike electrodes being coupled to said cathode.

3. A television receiver as claimed in claim 1 wherein said switching means comprises a transistor having emitter, base, and collector electrodes, said switching signal source being coupled to said base, one of the remaining electrodes being coupled to said cathode, said switching signal having an amplitude sufficient to saturate said transistor during said other intervals.

4. A television receiver as claimed in claim 1 wherein said stabilizing means includes an amplifier having an input coupled to receive said video signals and to said applying means.

5. A television receiver as claimed in claim 4 wherein said amplifier comprises a differential amplifier including a Zener diode.

6. A television receiver as claimed in claim 1 wherein said beam current-measuring means further comprises a rectifier.

7. A television receiver as claimed in claim 1 wherein said beam current-measuring means further comprises a direct current restorer.

8. A reciever as claimed in claim 1 wherein said stabilizing means is connected to said control electrode.